United States Patent Office 2,831,821
Patented Apr. 22, 1958

2,831,821

MOLDING POWDERS CONTAINING BUTENYL-PHENOL-FORMALDEHYDE CONDENSATION PRODUCTS

Roger M. Christenson, Whitefish Bay, Wis., and Richard A. Freeman, Rockford, Ill., assignors to Pittsburgh Plate Glass Company No Drawing. Application April 12, 1954
Serial No. 422,678

3 Claims. (Cl. 260—17.2)

This invention relates to a resinous composition comprising a condensation product of an alkenyl phenol and an aldehyde and it has particular relation to a resinous composition comprising a molding powder of discrete particles of a filling or reinforcing agent permeated with, or coated by a condensation product of the foregoing type.

It has heretofore been proposed to prepare condensation products of o-crotyl phenol such as is obtained by reaction of sodium phenolate with crotylbromide and rearranging the ether by condensation with aqueous formaldehyde under reflux on a steam bath. The resultant condensation products were soft and of reddish brown color. It was suggested to employ these resinous products as modifiers for certain other resins such as the addendum product of metastyrene and to employ the resultant compositions as coating media; for such purposes, they were of some merit since films thereof, when properly applied, withstood exposure to weathering conditions substantially better than compositions of the primary, or base resin (e. g., polymerized metastyrene). However, the condensation products, per se, do not appear to have been of particular merit since even thin films thereof were slow drying, even when baked at temperatures of 125° C. to 150° C. Often several hours were required in the operation. The reddish brown color above alluded to left much to be desired where products of light or delicate color were to be prepared.

This invention comprises the provision of molding powders containing as binders, condensation products of reactive aldehydes and certain alkenyl substituted phenols and notably mixtures of butenyl-phenols such as may be obtained by reaction of a phenol and a dienyl hydrocarbon such as butadiene in the presence of a Lewis acid or Friedel-Crafts catalyst. The condensation products are liquids or solids, or can be liquified by fusion or by solution in an appropriate solvent medium. The liquid or solid materials can successfully be ground, or otherwise mixed with a pulverulent or comminuted filler material, or reinforcing agents such as the various powders or flocs of wood flour, paper pulp, pulverulent silica, magnesium silicate, etc., to provide molding compositions embodying discrete, or at least mutually translatable particles including the condensation products as a coalescible binder. The resins, if solids, may also be ground in that state with fillers to provide compositions which under heat and pressure, can be coalesced to a solid, strongly coherent state.

The condensation product, regardless of the mode of incorporation with the filler, is characterized by an added degree of functionality in the unsaturated side chain, where the ethylenic groups provide points of reactivity permitting of addendum reaction between contiguous similar molecules, or with molecules of other compounds containing groups reactive by addition. An advantage of these ethylenic groups resides in their capacity to react to effect molecular growth without liberation of water. The particles constitute a molding material which can be introduced into molds of various sizes and shapes and under the influence of heat and pressure, the particles comprising the condensation products melt to consolidate and fill out the mold design. They also coalesce and cure to provide a continuous body of high strength, good dielectric properties and high resistance to reaction of chemical agencies. When so employed, the condensation products will set to the desired hard, resistant state within a matter of minutes, as contradistincted to the hours required in the drying or setting of the films of o-crotyl phenol heretofore recognized. Moreover the products instead of being red, or brown in color are, in the absence of added coloring agents, quite light and in this respect they contrast with other known phenolic condensation products. This latter property, often is highly desirable where a light color, or a delicate tone or tint of an added color is required.

Mixtures of alkenylphenols suitable for condensation with aldehydes such as formaldehyde to provide condensation products which may be employed as binders in the formulation of molding powders in accordance with the provisions of the present invention, may readily be obtained by the methods described in copending applications such as Serial No. 300,359, filed July 22, 1952, and Serial Nos. 337,226, or 337,227 or 337,228 or 337,229, all filed February 16, 1953.

As above indicated, the method of preparing a mixture of alkenyl substituted phenols such as butenylphenol, as the phenolic component for use in the preparation of the resins employed as binders in the molding powders of this invention involves the reaction of a conjugated diene with a phenolic compound in the presence of certain catalysts, such as the Friedel-Crafts compounds, or the Lewis acids. For example, the reaction product obtained by the reaction of butadiene-1,3 with phenol in the presence of an aqueous sulfuric acid catalyst, is quite satisfactory. The resultant product is generally composed of less than about 15 percent unreacted phenol, less than about 5 percent ethers, 55 to 70 percent by weight of monobutenyl-phenols and 15 to 40 percent of the higher boiling phenols including di- and tributenylphenols and polyphenols. Ordinarily, the unreacted phenol and ethers will be removed from the reaction mixture by distillation before the condensation reaction with an aldehyde is effected; however, this is not a critical step, since the condensation reaction takes place readily even though the unreacted phenols and ethers are not removed. Mixtures containing smaller quantities of monoalkenylphenols and 15 to 50 percent of higher boiling phenols and the balance polyphenols, and ethers may also be employed with good results, as may be mixtures containing no monoalkenylphenols. Also, the mixtures may be composed of ortho- and para-alkenylphenols such as ortho- and para-monobutenylphenols and in fact, excellent resins well suited for use as binders in the molding compositions of the present invention are obtained when such a mixture is employed.

It is also permissible under the provisions of the present invention to replace a portion of the alkenylphenols with non-alkenylphenols containing no unsaturated side chain and being represented by phenol, butylphenol, amylphenol, and the like. These latter types of condensation products may not possess all of the merits and advantages attending the use of the mixtures from alkenylphenols alone, but so long as there is a substantial proportion of the latter in the condensation products, at least some of the advantages attending the use of the latter can be attained.

The foregoing techniques are usually preferred in the preparation of mixtures of alkenylphenols and the mixtures so prepared may be reacted with aldehydes such as formaldehyde to provide thermosetting condensation products of exceptional merit in the preparation of molding powders; however, it is to be understood that other methods may sometimes be employed to provide useful mixtures of alkenylphenols which may be employed in lieu of the foregoing. This invention includes the use of such other mixtures of phenols where the latter are of the character of those above described in their properties regardless of the method by which they are obtained. While the mixtures of butenylphenols are usually preferred and it is considered that they are more satisfactory than any specific pure compound such as o- or p-butenylphenol, the use of the pure compounds in the preparation of molding powders is novel, and for some purposes, may be desirable. Accordingly, it is included by the present invention.

As illustrative of alkenyl substituted phenolic compounds which preferably in the form of mixtures may be condensed with an aldehyde such as formaldehyde (or formaldehyde yielding compounds) to form the binders in the novel molding compositions of the present invention, there are suggested the following products of the reaction of butadiene-1,3 and phenol:

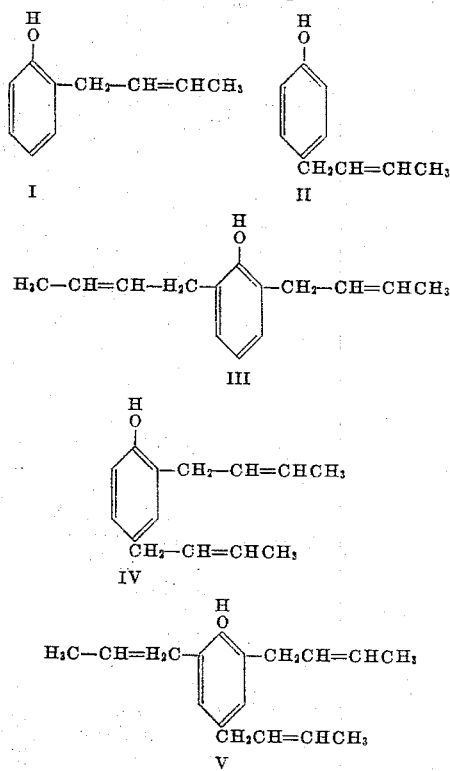

The above compounds are all readily obtained by the reaction of the phenolic compounds with the conjugated dienes in accordance with the methods described in the copending applications above alluded to.

Phenolic compounds which may be reacted with conjugated dienes and notably with butadiene to give alkenyl substituted phenols suitable for use in the preparation of the molding powders of the present invention include:

TABLE A
Phenol
Catechol
Resorcinol
Pyrogallol
Tertiary butyl catechol
Betanaphthol
Guaiacol
o-, m-, and p-cresol
2,3-xylenol
2,5-xylenol
3,4-xylenol
Meta phenols from coal hydrogenation
Bis(4-hydroxyphenyl) 2,2-propane Typical conjugated dienes which react with phenolic compounds to form the desired mixture of alkenylphenols include:

TABLE B
Butadiene-1,2
2-methyl butadiene-1,3
Piperylene
2-methyl pentadiene-1,3
Cyclopentadiene
Methyl cyclopentadiene
Hexadiene-1,3
1-chloro-2-methyl butadiene-1,3

The following table includes examples of several butenylphenols which may be used:

TABLE C
Butenylcresol or mixtures
Butenylcatechol or mixtures
Butenyl-2,5-dichlorophenol or mixtures
Butenyl-2,5-dinitrophenol or mixtures
Butenyl-2,3-dimethoxyphenol or mixtures
Mono-, di- and tributenylresorcinol
Mono-, di- and tributenylguaiacol
2-chlorobutenylcresol
2-chlorobutenylphenol
2-iodobutenylphenol
Ortho- and para-cyclopentenylphenol or mixtures
Pentenylphenol or mixtures
Pentenylcresol or mixtures
Cyclopentenylphenol or mixtures
Pentenylguaiacol or mixtures
Halopentenylphenol or mixtures
Halopentenylguaiacol or mixtures In the reaction of these alkenylphenol mixtures with aldehydes such as formaldehyde, it may be that the trialkenylphenols, where they are present in the mixtures, do not actually condense with aldehydes, at least to the same extent as do the mono-, and dialkenylphenols such as o-crotylphenol; but instead they react through the unsaturated linkages, or by other mechanism. This type of reaction of course is not possible with conventional phenols and this fact may account at least in part for the improved color, better electrical properties and faster cures characterizing the condensation products herein disclosed when they are employed as binders in molding powders.

In the preparation of condensation products which are used in the practice of the present invention, any aldehyde may be employed to provide a condensation product adapted for use as a binder in a molding powder. However, the present preference is for aldehydes of low, or moderate molecular weight and containing only carbon, hydrogen and oxygen. Formaldehyde is particularly preferred. Others include ethyl aldehyde, propyl aldehyde, butyl aldehyde, furfural, acrolein etc. It will be appreciated that in the preparation of the condensation products, formaldehyde may be replaced by materials which decompose upon heating to yield formaldehyde or otherwise react to produce the same products with the phenolic compounds as formaldehyde. Such formaldehyde-yielding compounds include paraformaldehyde, or trioxymethylene. An aqueous 37 percent solution of formaldehyde is generally used very successfully. Alcoholic solutions of formaldehyde can be used.

In carrying out the condensation involved in the preparation of the binder resins, various catalytic agents may be employed. For example, acids represented by toluenesulfonic, sulfuric acid, or hydrochloric acid may be employed. However, alkaline catalysts can be used. Suitable alkaline catalysts include: Sodium hydroxide, potassium hydroxide, barium hydroxide, sodium carbonate, potassium carbonate, ammonia, hexamethylenetetramine and the like. These alkaline materials effectively produce a condensation reaction between alkenylphenols and the aldehydes which after acidification and separation of the aqueous phase, provide liquid, or soluble products. These, which when applied as binders to various comminuted materials to form molding powders, can be cured by application of heat and pressure to form moldings which are of light color, good electrical properties, good strength, high chemical resistance and other valuable properties. Ammonia and hexamethylenetetramine catalyzed resins can be used without acidification after evaporation of the water present.

In the preparation of condensation products of alkenylphenols and aldehydes by alkaline catalysis, the proportion of the alkaline agent may be varied, but in general very satisfactory results are obtained by the use of about ¼ equivalent of catalyst for each equivalent of the alkenylphenol compound to be formed. Based upon the total weight of reactants, about 0.5 to about 5 percent of alkaline material is used. Larger amounts of the catalyst may be employed, if desired, but of course, the use thereof tends unduly to increase the expense involved in the reaction without added advantages in other respects.

While useful thermosetting condensation products are obtained, with a relatively wide range of molar ratios of aldehyde to alkenylphenols, it has been found that the best products for use in the formation of molding powders are obtained when the molar proportion of aldehyde per mole of the phenol is between approximately 0.8 and 2. For some applications, however, the lower limit of aldehyde may be about 0.5 mole per mole of the alkenylphenol and the upper limit of the aldehyde may be as high as about 5 moles per mole of the phenolic compound. For most purposes these extremes are not desirable. Usually, if the aldehyde content is dropped substantially below 0.8 mole per mole of the phenolic compound, the resinous product obtained does not give as good physical properties. If the ratio of the aldehyde is increased substantially above 2 moles per mole of the alkenylphenols, the process tends to become uneconomical since the products are little if any better as thermosetting binders in the molding powders than those containing more moderate amounts of the aldehyde.

In the preparation of the thermosetting condensation products of this invention, the reaction can be effected by first reacting the alkenylphenols and catalysts under non-oxidizing conditions, e. g., under an inert atmosphere, such as an atmosphere of nitrogen or carbon dioxide, and/or in the presence of a reducing agent such as sodium hydrosulfite, thus to protect the double bond of the alkenyl group. The aldehyde is added slowly at about room temperature (25° C.) until solution of the phenolic component is obtained after which, the temperature is allowed to rise to about 35° C. at which level, it is maintained until the remainder of the aldehyde is incorporated. The reaction is then allowed to proceed for about 48 hours at room temperature. The reaction mixture is then carefully acidified to a pH of about 5 with a mineral acid such as hydrochloric acid or sulfuric acid or with a carboxylic acid such as acetic acid or propionic acid. During the acidification, two layers are formed, one of water and the other of alkenylphenol resin. The water layer is drawn off and the water-insoluble layer of resin is water washed 4 or 5 times.

At this stage it is advantageous, though not a prerequisite, to add about 0.1 percent by weight based upon the resin of a sequestering agent such as ethylenediamine tetraacetic acid which forms a complex with any iron in the reaction mixture. The iron is thus bound chemically and is in effect eliminated from the system; if allowed to remain free or if iron or steel materials were present in the molding composition or in contact with it darkening might result.

The resin products may be freed of any water remaining therein by application of vacuum stripping under a pressure of about 20 to 55 millimeters of mercury (absolute). Alternatively, water may be removed azeotropically by adding xylene or toluene or butanol and distilling. The mixture may also be blown with an inert gas such as carbon dioxide or nitrogen, to remove water. Complete stripping will usually be effected at the conclusion of the reaction; but oviously, at least partial stripping may be continuously or intermittently conducted during the course of the reaction to retard any tendency to hydrolyze the product and thus to obstruct the reaction.

The resinous products prepared by the foregoing techniques are generally recovered as viscous liquids or at least as fusible, or soluble solids. These, with or without dilution, can be employed to impregnate, or to coat comminuted materials such as pigments, or a material composed of short discrete particles of fibrous nature such as asbestos or wood flour. The resultant compositions are valuable molding materials under the provisions of this invention. They can be employed as loose, or crumbly masses, or they can be compressed into preforms and tablets. In either event, they can be molded to final form under heat and pressure.

The above described method for carrying out the condensation is generally preferred, particularly when the alkenylphenol mixture is a mixture of butenylphenols. However, other methods may be employed. For example, liquid condensation products that can be employed to impregnate or to coat filler materials to form molding powders, may be obtained by simply mixing the reactants and an acid, or alkaline catalyst and allowing the mixture to stand at room temperature for a sufficient period, e. g., 48 hours, or thereabouts, to obtain condensation; or by maintaining the reaction mixture at a temperature as high as about 100° C. or even higher. Naturally, in event that higher temperatures are utilized, the condensation will require less time than when the reaction is conducted at room temperature.

Suitable resins can be prepared by using either acid or alkaline catalysts. Either fluid or hard, grindable resins can be prepared by controlling formaldehyde ratios and reaction conditions. The acid catalyzed condensation proceeds through a stage during which the resinous product can be recovered in a liquid, or solid fusible or soluble state and is applicable as a bonding agent to fillers to form valuable molding powders.

The preparation of alkenylphenols and notably butenylphenols which can be condensed with aldehydes such as formaldehyde in the presence of an alkaline, or acid catalyst to form liquid resins suitable for use as bonding agents in the preparation of the molding powders of this invention is illustrated by the following examples:

Example A

The apparatus comprised a stainless steel reactor of about 9 gallons capacity.

A mixture of the following components was introduced into this reactor:

| | Pounds |
|---|---|
| Phenol | 9.4 |
| Toluene | 20 |
| Butadiene | 6.5 |

The mixture was catalyzed with:

| | Pounds |
|---|---|
| Phosphoric acid | 10 |
| Sulfuric acid | 1.5 |

In conducting the reaction all of the raw materials except the butadiene were charged into the reactor. The butadiene was then added over a period of 3 or 4 hours while the temperature was kept between 60° C. and 70° C., which temperature was maintained throughout the run. The batch was then agitated for 16 hours, after which the catalyst layer was drawn off slowly and the mixture in the reaction vessel was made slightly alkaline with a base such as sodium hydroxide, or sodium carbonate.

The resultant product after unreacted phenols were distilled, comprised a mixture of butenylphenols (ortho-, meta-, para-, monobutenylphenols) as well as tri- and dibutenylphenols as hereinbefore described. There was also a small amount of unreacted phenol and some butenylphenol ethers. The mixture was well adapted for combination with aldehydes such as formaldehyde under the provisions of the present invention to provide valuable resinous products which were liquids or could be rendered adequately liquid by heating or by the application of suitable solvent. The liquid compositions could be employed for mixing with comminuted filler materials such as asbestos fibers, wood flour, titanium dioxide, silica and many other finely divided substances. Such filled compositions constitute molding powders well adapted for various molding operations under heat and pressure in molds of suitable configuration.

*Example B*

This example illustrates the use of polyphosphoric acid in the preparation of a butenylphenol mixture suitable for use in the preparation of a resin binder in a molding powder in accordance with the provisions of the present invention.

The reaction mixture comprised:

| | |
|---|---|
| Butadiene-1,3 | 54 grams (1 mole). |
| Toluene | 100 milliliters. |
| Phenol | 94 grams (1 mole). |
| Polyphosphoric acid | 23 grams. |
| Sulfuric acid (85 percent) | 10 grams. |

The reaction mixture was cooled to room temperature and was stirred for 14 hours to provide a condensation product which was washed with water, after which, the mixture was fractionally distilled.

The reaction product comprised 60 grams of a mixture of monobutenylphenols, namely, ortho-, and para-butenylphenols and minor quantities of di- and tributenylphenols.

The mixture was suitable for condensation with formaldehyde in the presence of an alkaline catalyst to provide a binder resin adapted to receive a filler, thus forming a useful molding powder that could be shaped and cured under heat and pressure.

*Example C*

In this example sulfuric acid of 67.2 percent concentration was employed as a catalyst.

The reaction mixture comprised:

| | Pounds |
|---|---|
| Phenol | 17 |
| Toluene (solvent) | 17 |
| Sulfuric acid | 28.8 |

The reaction mixture was charged into a glass lined reactor having an agitator and a heating device. The reactor was closed and 10.3 pounds of butadiene-1,3 were fed in over a period of 15 minutes, during which time the mixture was maintained at a temperature of about 55° F. The reaction mixture was agitated for 18 hours and was then allowed to settle and the acid layer was drawn off. The remainder of the reaction mixture comprising the desired butenylphenols was neutralized with sodium carbonate, after which it was subjected to distillation to remove toluene.

The product comprised 59 percent of monobutenylphenols of which 8 percent was dibutenylphenols and 29 percent was higher boiling phenols. Unreacted phenols and ethers constituted 4 percent. This mixture like that above described, could be reacted with formaldehyde (preferably in the presence of an alkaline catalyst) to provide viscous resinous products suitable for incorporation with comminuted materials in the preparation of novel molding powders of this invention.

The following examples illustrate the condensation of the butenylphenols prepared by such methods as are described in the preceding examples, A through C, with formaldehyde in the presence of an alkaline catalyst. The resultant condensates are liquid or fusible or soluble resins which can be incorporated with fillers to provide the desired molding powders.

*Example 1*

This example is an illustration of the condensation of butenylphenols mixture prepared in accordance with the provisions of Example A with formaldehyde.

The reaction charge comprised:

| | |
|---|---|
| Butenylphenol mixture | 3848 grams (26 moles). |
| Formalin (37 percent aqueous solution) | 4212 grams (52 moles). |
| Sodium hydroxide (catalyst) | 260 grams. |
| Water | 2600 grams. |

In conducting the reaction, the sodium hydroxide was added to the butenylphenols at a temperature of about 25° C. to 31° C., after which the formalin solution was added and the mixture was stirred for 2 or 3 days. Subsequently, it was heated to 31° C. for a period of 1 day to provide a clear solution. The clear solution was stirred for a period of 24 hours at the conclusion of which time it had attained a pH value of 10.2. The mixture was brought to a pH of 4.2 by the addition of 565 milliliters of hydrochloric acid.

The excess acid and the sodium salt of the acid were washed out countercurrently with about 8 gallons of water and the product was stripped to a viscosity of X to Y on the Gardner-Holdt scale.

In this example, any of the butenylphenol mixtures of Examples A through C could be employed.

The color of the product was 16 to 17 and the solids content was 86.2 percent. The weight of the product was 4536 grams, a yield of 117.8 percent. As presently described, this product was suitable for grinding, or otherwise incorporating, with various fillers including wood flour and other materials to provide a molding powder.

*Example 2*

In this example, a mixture of butenylphenols prepared in accordance with the provisions of Example A was mixed with formaldehyde in 1 to 1 ratio.

The reaction charge was as follows:

| | Grams |
|---|---|
| Mixed butenylphenols having the unreacted phenol removed by distilling at 110° C. and at a pressure of 25 millimeters (absolute) | 1110 |
| Formalin 37 percent solution in water | 608 |
| Sodium hydroxide | 75 |
| Water as a solvent for sodium hydroxide | 375 |

The sodium hydroxide in the water was added to the butenylphenol mixture at 25° C. and the temperature rose to 30° C. The formalin was added at a temperature of 26° C. to 31° C. and the batch cleared in 1½ hours. After the mixture had stood for 2 or 3 days, the pH value was 11.3. At this point, 174 milliliters of hydrochloric acid of a pH value of 1.95 to 2 was added and the mixture was heated to 95° C. for 4 hours. The batch was cooled to a hardened mass overnight, but was brought to a solution in 1000 milliliters of xylene by application of heat. The product was washed with water 7 times and was then stripped. A hard grindable resin resulted. The product could be applied to pulverulent materials to provide a molding composition in accordance with this invention.

*Example 3*

In this example, 148 parts by weight of a mixture of monobutenylphenols (primarily ortho-, and para-monobutenylphenols) and 10 parts of sodium hydroxide in 100 parts of water were mixed under an atmosphere of nitrogen or other gas designed to protect the ethylenic group of the butenylphenols. The mixture was cooled to maintain the temperature below about 35° C. When a homogeneous solution was obtained, 162 parts of 37 percent formalin (methanol free) containing 60 grams (2 moles) of formaldehyde were added at a moderate rate while the mixture was cooled to keep the temperature below about 35° C. The mixture was stirred for 48 hours at room temperature and the reaction mixture was acidified to a pH of 5 with a mixture of concentrated hydrochloric acid and water in equal parts by weight. A water insoluble layer which constituted the desired resin was formed and was washed 4 times with lukewarm water. The wash product was dehydrated by vacuum stripping under a pressure of 20 to 50 milliliters of mercury (absolute). The yield based upon the quantity of alkenylphenols employed was 120 percent. The color of the product was 10 to 14 (Gardner). The product was a liquid of a viscosity of W to Z on the Gardner Holdt scale at 25° C. The resin was completely miscible with ethanol, butanol, toluene and xylene. It was adapted for incorporation with comminuted filler materials to provide a powder adapted for molding under heat and pressure. Good products having satisfactory dielectric properties and high chemical resistance can be so obtained.

*Example 4*

Example 1 was repeated but with a molecular equivalent of furfural in place of formaldehyde. The mixture was catalyzed with 3 percent by weight based upon the mixture of sodium hydroxide and was maintained at 25° C. for 48 hours. It provided after acidification, washing and drying, a resin product useful for incorporation with pulverulent fillers to provide a molding powder. These powders, upon the application of heat and pressure would flow and the resin would coalesce to form molded articles of good dielectric properties and high resistance to chemical action.

*Example 5*

In this instance, crotonaldehyde was employed as the aldehyde component. It was mixed with butenylphenol in the proportion of 4 moles to 1. The mixture was catalyzed with 4 percent by weight of the sodium hydroxide and was reacted at 25° C. for 90 hours. This product after acidification, washing and drying, was a liquid which could also be used in the preparation of molding powders, which would flow out and coalesce under heat and pressure in a mold to fill out the design and to provide a useful molded article.

*Example 6*

Crotonaldehyde of Example 3 may be replaced with acetaldehyde. This product also was useful for the preparation of molding powders.

*Example 7*

A mixture of cyclopentenylphenols prepared by alkaline reaction was previously described, in an amount of 160 parts by weight was incorporated with 130 parts by weight of 37 percent formalin solution, and 1 part by weight of sodium hydroxide, in 5 parts by weight of water. The mixture was stirred at steam bath temperature (92° C. to 96° C.) for 1½ hours. The excess alkali was neutralized with acetic acid and the mixture was washed 5 times with water and was dried for several hours at steam bath temperature under a pressure of 20 milliliters of mercury (absolute). This resin could be incorporated with pulverulent filler materials to provide a useful molding powder.

*Example 8*

The phenolic component of this example comprised 20 parts by weight of a mixture comprising 12.3 percent unreacted phenol and ethers (boiling point 70° C. to 100° C. at 10 mm.) 66.3 percent monobutenylphenols (110° C. to 140° C. at 10 mm. pressure) and 20.4 percent of di- and tributenylphenols. This mixture was obtained by the method of Example C.

To the mixture of phenols, was added 20 parts by weight of 37 percent aqueous formaldehyde and 0.4 part by weight of hexamethylenetetramine. The butenylphenol-formaldehyde mixture was heated under reflux on a steam bath for 16 hours. The water and unreacted formaldehyde were removed by distillation leaving a resin soluble in ethyl alcohol, ethyl acetate, benzene, toluene and aromatic naphthas. This product was also useful in impregnating or coating comminuted fillers to form a valuable molding powder.

*Example 9*

In this example, 1515 grams of a mixture of di- and tributenylphenols, 300 grams of sodium hydroxide and 1500 grams of water were mixed to form a solution. To the solution was added 1215 grams of formalin while the temperature was maintained at 25° C. This mixture was blanketed with nitrogen and was left to stand for 120 hours after which the pH value was adjusted by acidification to 3.4. During the acidification, a lower water layer and a resinous top layer separated and the water layer was withdrawn. The resinous layer was washed 5 times with water and then distilled until a viscosity of W on the Gardner scale was obtained. The condensation product was useful for incorporation with comminuted fillers to provide a molding powder in accordance with the provisions of this invention.

*Example 10*

In accordance with this example, 1315.5 grams of a mixture of mono-, di- and tributenylphenols, 1440 grams of a formalin solution of 37 percent concentration and 144 grams of aqueous ammonium hydroxide were admixed by stirring. The temperature of the mixture rose to 97° C. during the addition. The reaction mixture was then held at about 100° C. for 6 hours after which, the hot water layer was decanted and the remainder of the reaction mixture was distilled to strip off excess water, formaldehyde and ammonium hydroxide. The product was a liquid of a solids content of 94.2 percent. Comminuted material such as wood flour could readily be incorporated with this liquid material to provide a valuable molding powder.

*Example 11*

In this example, a glass lined reactor which was equipped with an agitator, thermometer and such like conventional accessories, was charged with the following mixture:

| | Pounds |
|---|---|
| Mixed butenylphenols (monobutenylphenols, di- and tributenylphenols | 24.6 |
| Formaldehyde (37 percent aqueous solution) | 27 |
| Sodium hydroxide | 1.7 |
| Sodium hydrosulfite | 0.12 |

The reaction mixture was cooled to 75° F. to 80° F. and was agitated for 5 hours, after which it was allowed to stand for 43 hours. It was then acidified to a pH of 5 with 67 percent sulfuric acid and was allowed to stand until a water layer settled out. The water layer was drawn off and discarded and the wet resin (36.25 pounds) was treated with 0.04 pound of an aminotetracarboxylic acid known commercially as Sequestrene AA. The resin was heated to 220° F. and was stripped with inert gas (nitrogen) until a Gardner viscosity of W at 75 percent solids in normal butanol was reached. The resin was then thinned with 10 pounds of butanol and was filtered at 110° F. The product was of the following characteristics:

| | |
|---|---|
| Weight per gallon | 8.45 pounds. |
| Solids | 6.2 percent at 110° C. |
| Viscosity | U to R on the Gardner scale. |

The resultant condensation product could be incorporated with comminuted fillers including wood flour and the like to provide a composition which under the action of heat and pressure in a mold would coalesce to provide hard articles with excellent electrical properties.

*Example 12*

The charge employed in the preparation of the condensation product of this example comprised:

| | Grams |
|---|---|
| Mixture of pentenylphenols | 1620 |
| Formaldehyde (37 percent aqueous solution) | 1620 |
| Sodium hydroxide (50 percent aqueous solution) | 100 |
| Water | 100 |
| Sodium hydrosulfite | 8 |

The mixture was charged into a glass reactor where it was stirred for 48 hours at a temperature of 25° C. to 30° C. The reaction mixture was acidified with 70 percent sulfuric acid until a pH of 5 was reached. The water layer which had formed was drained off and 2 grams of Sequestrene AA were added to the remaining layer. The latter layer was then dried by blowing with an inert gas for 3 hours at 100° C. to provide a resin having a viscosity of $Z_2$ on the Gardner Holdt scale. This resin, with or without thinning, could be incorporated with various filler materials including pulverized asbestos, wood flour or the like. The resultant product could then be molded under heat and pressure in accordance with conventional practice.

For purposes of testing certain of the condensation products of Examples 1 through 12 in the preparation of molding powders, the condensation products prepared as previously described, were ground with appropriate fillers, some of which are hereinafter described in specific examples. The condensation products where liquid could be directly milled into the filler material. In some instances tests were conducted by dissolving the condensation product in an appropriate solvent and then mixing the solution with the filler material. The intermixing of pulverulent filler with pulverized fusible solid resin is also included within the scope of the invention. Mixing of filler and resin may be performed with conventional apparatus such as Banbury mixers, rollers or mullers or other appropriate devices. The resin may be directly incorporated with a pulverized filler, or it may be applied by impregnation or coating of a sheet material such as paper of cellulose or asbestoes fibers and then beating or grinding the sheet to a pulverulent state.

In some instances, some samples which were subjected to molding tests were subjected to a preliminary partial cure. That is, the molding powders were baked in pulverized state in order to effect a partial cure of the condensation product employed as a bonding agent; but the baking operation was stopped before the final state of infusibility and insolubility was attained.

In the examples which are to follow, a catalyst of the hardening and thermosetting reaction involved in the curing of the condensation product was not employed. However, it will be apparent that the usual catalysts employed in hardening and setting phenolic resins may be incorporated in the condensation product or in the molding powder, if so desired. Examples of such catalysts include: Para-toluene sulfonic acid, phosphoric acid, or other latent acid reacting materials. Also, formaldehyde producing reagents such as hexamethylenetetramine or paraformaldehyde may be employed in the molding composition to attain a speed of setting or desired properties.

The filler materials may be incorporated in such amount as to obtain a crumbly or powdery mass comprising the filler and the bonding agent intimately associated together and being adapted to flow under heat and pressure to provide coherent bodies configuring to the mold shape. If desired the mixture of filler and bonding agent may be prepressed to a coherent solid and in a shape appropriate for use as a blank that can be pressed to final shape and cured to a hard, thermoset state in a subsequent molding operation. In most instances, the molding compositions or powders of this invention will contain about 30 to 60 percent by weight of the condensation product, the rest of the composition being primarily the filler material in finely divided, or comminuted form. The foregoing proportions actually do not include the extreme limits that may sometimes be employed. However, in most instances satisfactory molding compositions or powders will include a minimum of about 25 percent by weight of the condensation product and a maximum of about 75 to 80 percent.

The compositions, optionally, may also include agents such as zinc stearate or the like designed to promote mold release and to improve surface smoothness of the finished product. Likewise, plasticizers and limited amounts of other resins compatible with the phenolic resin may be included.

The alkenylphenols herein disclosed may be modified with various other resins compatible therewith to provide useful binder compositions for molding powders. Useful resins which may be so employed comprise:

Polyvinyl butyral
Styrene-butadiene polymers
Acrylonitrile-butadiene polymers
Vinyl chloride polymers
Alkyd resins
Vinyl resins
Varnish
Rosin condensate
Melamine resins
Urea resins
Acid polymerized butenylphenol-formaldehyde resins The modified alkenylphenols may be incorporated with fillers as hereinbefore described to provide desirable molding powders.

In the examples which are to follow, the mold employed had a cavity of circular section designed to form a round disc of about 2½ inches diameter and of a thickness of about 3⁄16 to ¼ of an inch. This mold design was selected because of its simplicity and because it was well adapted to form pieces suitable for testing. Manifestly, various other shapes and designs dependent upon the articles to be produced, could be employed if so desired.

Usually the foregoing compositions will cure to a hard thermoset state within a period of about 20 to 30 minutes even in the absence of catalytic agents.

The formation of test discs from mixtures of filler materials and the foregoing condensation products is illustrated by the following examples:

*Example 1*

In this example, the condensation product employed as the bonding agent for the filler was comprised of 2 moles of formaldehyde to 1 mole of butenylphenol. The reaction was effected in the presence of an alkaline catalyst. The conditions of reacton were essentially those described in Example 1.

The mixture of equal parts by weight of the butenylphenol-formaldehyde condensation product and wood flour were appropriately milled to obtain thorough intermixture. The mixture was precured for 5 minutes at 350° F. to provide a product which although partially set or cured, still possessed an adequate degree of flow and thermoplasticity for subsequent molding operations. The latter was conducted by introducing the molding composition into the mold of the foregoing design. Curing was effected at 320° F. over a period of 20 minutes. The molding pressure was 2100 pounds per square inch. This pressure was employed in all subsequent examples, but is merely by way of example; higher or lower pressures within reason could be employed, if so desired. The product obtained was of a fine light color, as contrasted with the usual discolored bodies obtained from molding powders containing phenolic resins. The hardness was 49 to 53 on the Barcol scale. The compression strength of the sample was 24,250 p. s. i. This was a good molding, manifestly indicating the value of the molding composition for the manufacture of many commercial articles such as furniture, electrical panels and many other materials.

*Example II*

In this example, a condensation product prepared in accordance with the procedure outlined in Example 1 was employed as the binding agent. The filler material was a very finely divided siliceous material sold under the trade name of Hi-Sil. This is understood to be derived by precipitation of calcium silicate and is understood to be of a particle size of approximately 0.025 to 0.03 micron. In chemical composition it is primarily silica but contains about 4 percent by weight of calcium calculated as calcium oxide. In preparing a test sample, 60 parts by weight of the condensation product were mixed with 40 parts by weight of the pulverulent material. The mixture was heated in an oven for precure of the resin for 10 minutes at 350° F. The resultant product was charged into a mold, where it flowed readily under pressure to fill out the design. It was cured at 320° F. under a pressure of 2100 pounds p. s. i. for 30 minutes.

The resultant sample was of good surface appearance, good color and a Barcol hardness of 36–42. The compression strength of the sample was 25,950 p. s. i.

*Example III*

The condensation product in this example comprised equal moles of butenylphenols and formaldehyde reacted in accordance with the procedure outlined in Example 2. The resin was mixed with the pulverulent material. The composition comprised 48.5 percent by weight of the condensation product, 50 percent by weight of a wood paper pulp sold under the name of Solka Floc and 1.5 percent by weight of zinc stearate. The mixture was precured for 10 minutes at 350° C. and was then molded for 30 minutes at a temperature of 320° F. The product was of light yellow color and of good appearance. The strength in compression was 18,200 p. s. i.

*Example IV*

In this example wood flour was substituted for the paper pulp of Example III. The proportions were the same as in Example III. The condensation product comprised equal moles of butenylphenol and formaldehyde condensed to provide a solid resin. This solid material was incorporated with the filler material by preliminarily grinding it to a powder and then mixing the powder with a filler. The preliminary curing stage was omitted. Final cure was effected in the mold at a temperature of 320° F. over a period of 25 minutes. The final product was of a good color. The product was hard and coherent.

In the preceding Examples I through IV, any of the condensation products 1 through 12 could be employed. Other fillers could be employed.

*Example V*

A glass lined reactor was charged with a mixture comprising:

|  | Grams |
| --- | --- |
| Monobutenylphenol mixture | 1480 |
| Formalin (37 percent) | 678 |
| Hydrochloric acid (concentrated) | 50 |

The mixture was heated while being stirred at a temperature of about 25° C. for 16 hours. The mixture in the flask was then further charged with 200 milliliters of butanol and reaction vessel was provided with a condenser having an azeotropic separator for water. The mixture was heated to reaction temperature and reaction was continued (with return of butanol) until the water of reaction ceased to evolve. The mixture in the vessel was blown with inert gas until all of the butanol was removed. A light colored hard resinous product was obtained. Some of this was ground to a powder which was moldable to a hard coherent state at 350° C. In order to form a molding powder, grind this powder with a filler such as wood flour and treat as in Example IV.

The embodiments of the invention herein described are by way of illustration. It will be apparent to those skilled in the art that these may be modified in numerous ways without departure from the spirit of the invention or the scope of the appended claims.

We claim:

1. A molding powder adapted to cohere and to cure under heat and pressure to form a molding of light color and high mechanical strength, said powder consisting essentially of a mixture of pulverulent filler and binder, the filler being about 25 to 75 percent of the mixture of filler and binder, the binder being adapted to cure to a thermoset state and being a condensation product formed under non-oxidizing conditions and in the substantial absence of reactive iron, and also being composed of about 0.8 mole to 2 moles of formaldehyde and about 1 mole of a phenol selected from the group consisting of:

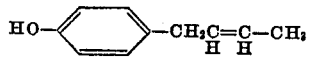

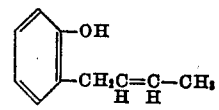

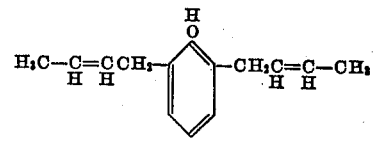

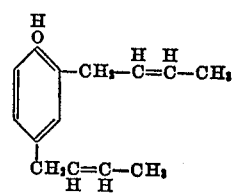

and

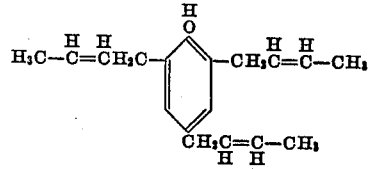

and mixtures thereof.

2. A molding powder adapted to cohere and cure under heat and pressure to form a molding of light color and high mechanical strength and consisting essentially of a mixture of wood flour and binder, the wood flour being about 25 to 75 percent of the mixture, the binder being adapted to cure to a thermoset state and being a condensation product formed under non-oxidizing conditions and in the substantial absence of reactive iron and being composed of about 0.8 mole to 2 moles of formaldehyde and about 1 mole of a mixture of phenols prepared by reacting a butadiene and phenol in the presence of an acid condensation catalyst for a period of at least three hours.

3. A molding powder adapted to cohere and to cure under heat and pressure to form a molding of light color and high mechanical strength, consisting essentially of a mixture of pulverulent filler and binder, the filler being about 25 to 75 percent of the mixture and being from a class consisting of wood flour, paper pulp, and pulverulent silica and magnesium silicate, the binder being adapted to cure to a thermoset state and being a condensation product formed under non-oxidizing conditions and in the substantial absence of reactive iron and being composed of about 0.8 mole to 2 moles of formaldehyde and about 1 mole of a mixture of phenols prepared by reacting a butadiene and phenol in the presence of an acid condensation catalyst for a period of at least three hours.

References Cited in the file of this patent

UNITED STATES PATENTS

| | | |
|---|---|---|
| 2,006,043 | Dykstra | June 25, 1935 |
| 2,114,121 | Bender | Apr. 12, 1938 |
| 2,242,250 | Honel et al. | May 20, 1941 |
| 2,441,860 | Whetstone | May 18, 1948 |
| 2,587,578 | Jones | Mar. 4, 1952 |
| 2,656,335 | Bloch | Oct. 20, 1953 |